Oct. 18, 1960     O. K. KELLEY     2,956,649
MULTIPLE DISC WHEEL BRAKE AND HYDRAULIC ACTUATING SYSTEM
Filed Dec. 17, 1956     6 Sheets-Sheet 2

INVENTOR.
Oliver K. Kelley
BY
D. C. Staley
HIS ATTORNEY

INVENTOR.
Oliver K. Kelley
BY
D. C. Staley
HIS ATTORNEY

Oct. 18, 1960     O. K. KELLEY     2,956,649
MULTIPLE DISC WHEEL BRAKE AND HYDRAULIC ACTUATING SYSTEM
Filed Dec. 17, 1956     6 Sheets-Sheet 4
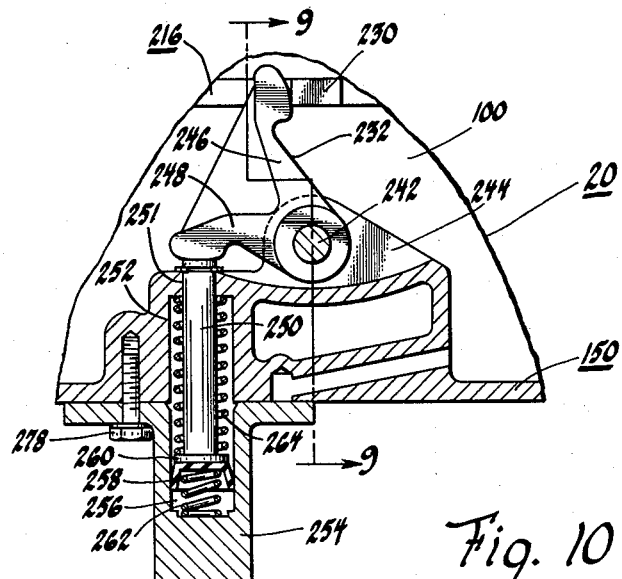
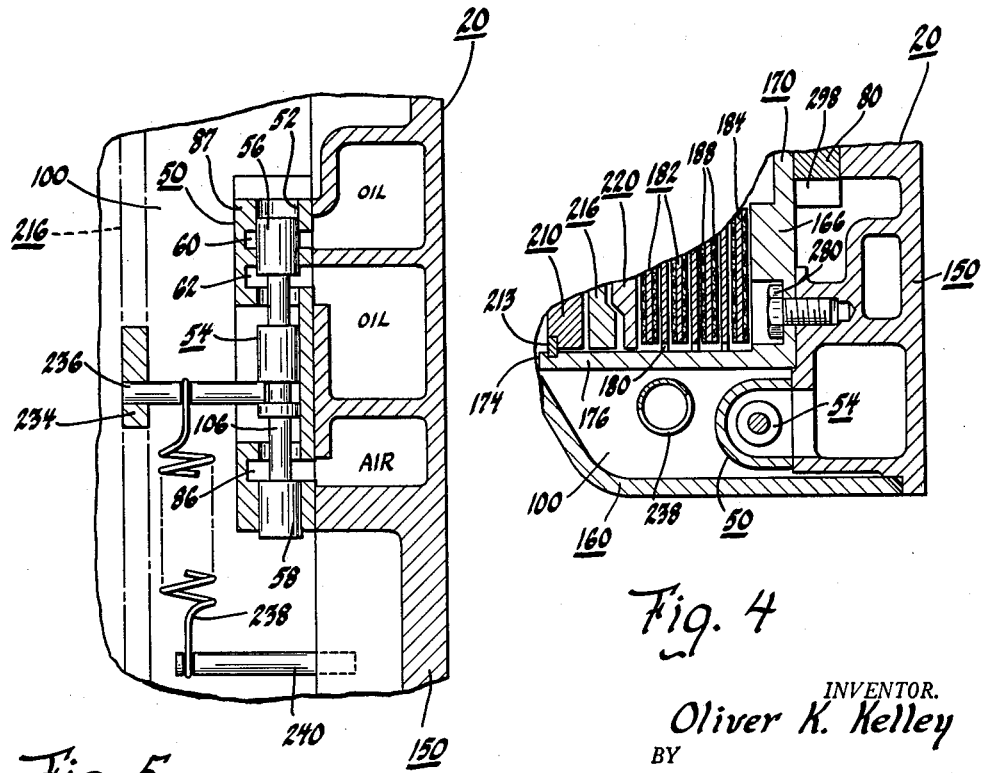
INVENTOR.
Oliver K. Kelley
BY
D. C. Staley
HIS ATTORNEY Oct. 18, 1960   O. K. KELLEY   2,956,649
MULTIPLE DISC WHEEL BRAKE AND HYDRAULIC ACTUATING SYSTEM
Filed Dec. 17, 1956   6 Sheets-Sheet 5

INVENTOR.
Oliver K. Kelley
BY
D. C. Staley
HIS ATTORNEY

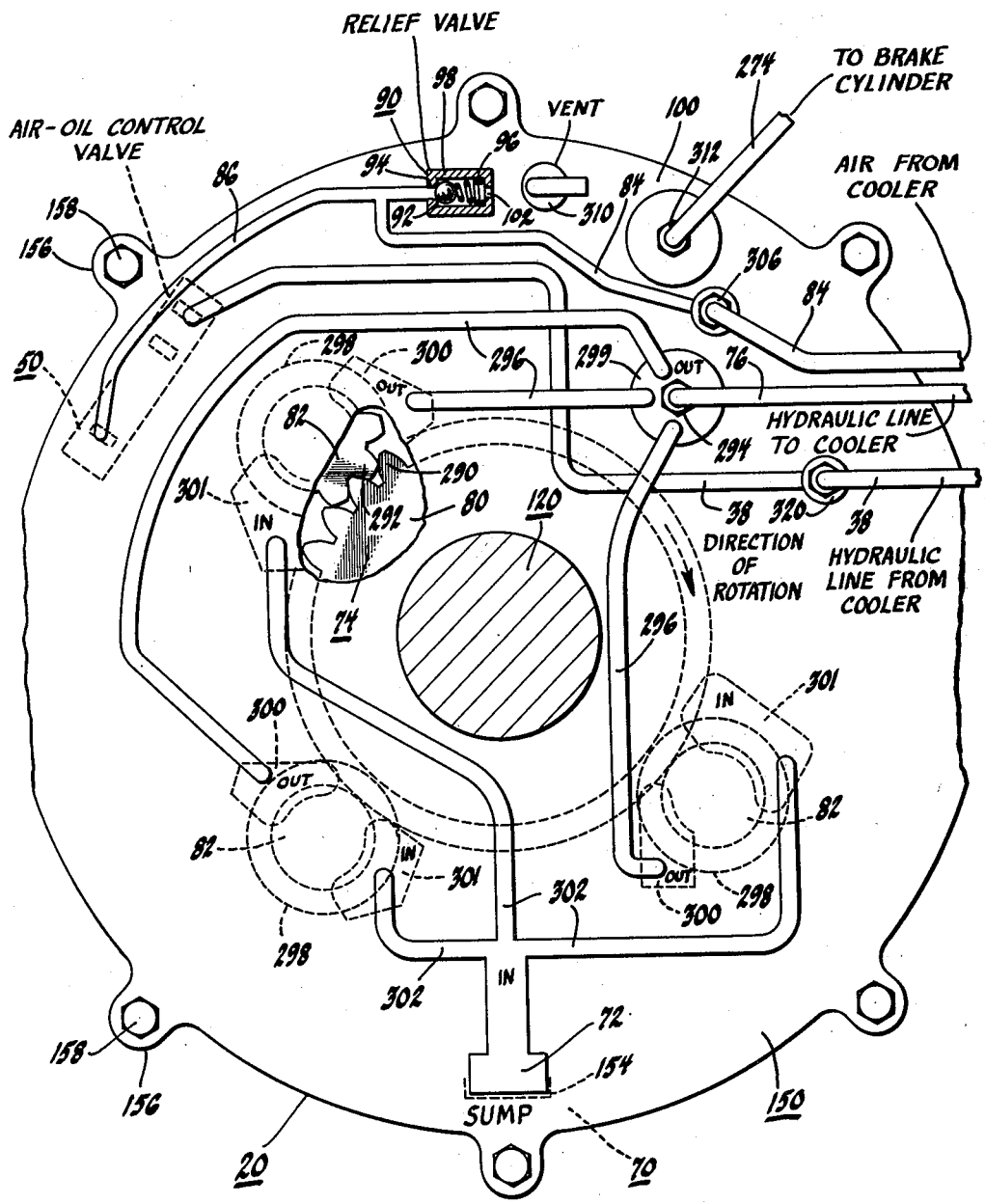

United States Patent Office 2,956,649
Patented Oct. 18, 1960

2,956,649

MULTIPLE DISC WHEEL BRAKE AND HYDRAULIC ACTUATING SYSTEM

Oliver K. Kelley, Bloomfield Hills, Mich., assignor to General Motors Corporation, Detroit, Mich., a corporation of Delaware Filed Dec. 17, 1956, Ser. No. 628,629

8 Claims. (Cl. 188—264)

This invention relates to multiple-disc hydraulic brakes and, particularly, to mechanical structure and a hydraulic system for use with such brakes.

An object of this invention is to provide a hydraulic braking system with pump mechanism for circulating cooling fluid through a brake assembly when the brakes are applied and adapted for low horsepower loss or drag when the brake is not applied.

Another object is to provide a valving mechanism associated with a brake assembly operable by brake actuation to connect passages with pump mechanism for circulating a cooling fluid between multiple-brake discs while permitting free air circulation through the same passages when the brake is not applied.

Another object is to provide a brake assembly having a valving mechanism attached to a housing with a sump therein scavenged in unison by a plurality of pumps, the valving mechanism being operable concurrently with brake actuation to circulate a cooling fluid forced from a heat exchanger reservoir by air pressure in the heat exchanger regulated to a predetermined pressure value by a blow-off check valve associated with the valving mechanism which allows air to circulate freely through the brake assembly for minimum horsepower loss when the brake is not applied.

Another object is to provide a multiple-disc-type wheel brake actuated by cooperable cam plates of which one has a radially extending lug or arm engaged to be rotated by a brake-cylinder-actuated bell crank to apply braking force.

Another object is to provide a hydraulic circuit with a multiple-disc brake assembly wherein scavenging pumps continually operate to supply a heat exchanger having an air separator and fluid reservoir together with a valve and brake actuating mechanism operable to circulate cooling fluid upon brake actuation under the force of air under pressure which is permitted to circulate freely when the brakes are not applied with the air subject to venting at a predetermined pressure value through a blow-off or pressure relief valve associated with the brake assembly.

Another object is to provide a multiple-disc brake assembly with a housing providing sump space scavenged by gear-type pumps through a filtering screen attached to the housing with the sump, the pumps passing pressurized air or cooling fluid between the brake discs to a heat exchanger including an air separator, fluid reservoir and cooler under control of a valve mechanism attached to the housing and operable concurrently with brake actuation to pass cooling fluid.

Further objects and advantages of the present invention will be apparent from the following description, reference being had to the accompanying drawings wherein a preferred embodiment of the present invention is clearly shown.

In the drawings:

Figure 4 is a fragmentary cross-sectional view taken along line 4—4 of Figure 2.

Figure 5 is a fragmentary cross-sectional view taken along line 5—5 of Figure 2.

Figure 7 is a rear side view of the brake assembly of Figures 2 and 6 together with a diagrammatic representation of fluid conduits and passages associated with the brake assembly in accordance with the schematic view of Figure 1.

Figure 8 is a fragmentary cross-sectional view taken along line 8—8 of Figure 2.

Figure 9 is a fragmentary cross-sectional view taken along line 9—9 of Figure 2 and Figure 10.

Figure 10 is a fragmentary cross-sectional view taken along line 10—10 of Figure 2.

Figure 1:
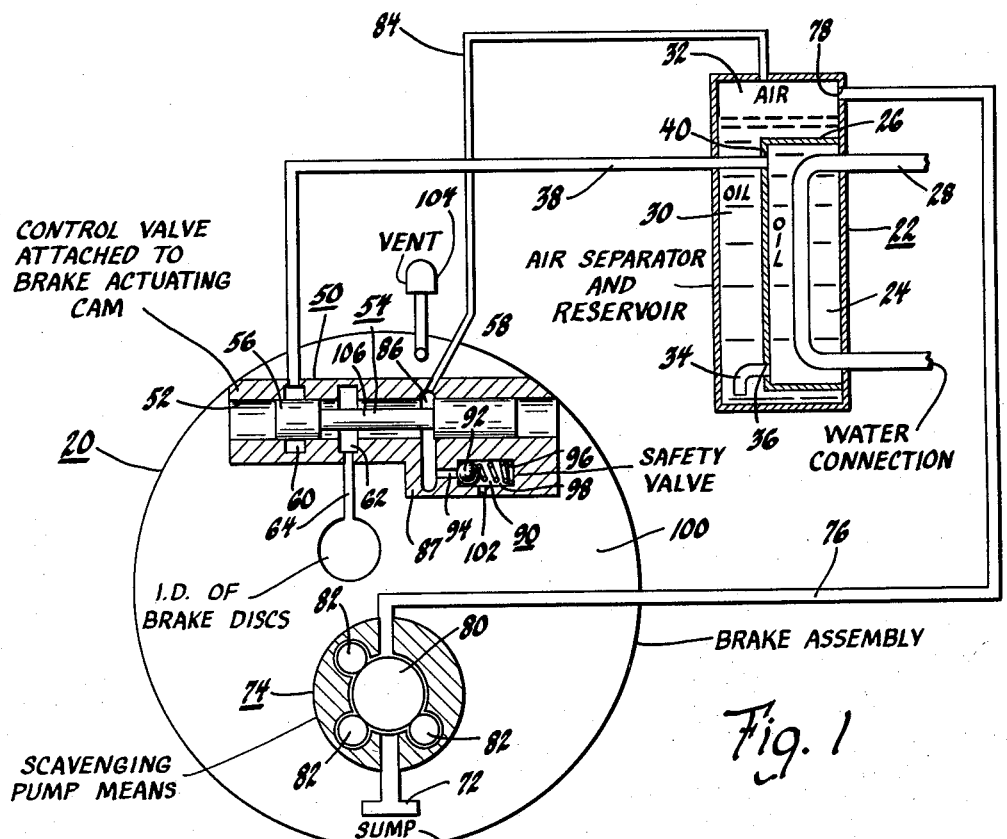
Figure 1 is a schematic representation of a hydraulic braking system and brake assembly in accordance with the present invention.

With particular reference to Figure 1, the present invention provides a brake assembly, generally indicated by the numeral 20, and a heat exchanging means, generally indicated by the numeral 22. The heat exchanger 22 includes a cooler portion, or section, 24 containing oil retained by a wall 26. The oil is retained adjacent and in heat exchanging contact with a tubing 28 connected with a radiator in a motor vehicle for supplying cooled water for lowering the temperature of the oil. The radiator is of a conventional type and is, therefore, not shown. The tubing 28 is broken off to indicate where the water connections are made. The heat exchanging means also includes a chamber 30 which also contains oil to a level indicated by the dotted lines in the heat exchanging means 22. A pocket of air in an upper portion 32 of the chamber is retained with the heat exchanging means for a purpose to be explained in further detail below. A tube fitting 34 is connected to an aperture 36 in a bottom portion of the wall 26 for receiving oil from the chamber 30 into the chamber 24 in accordance with the level of oil in the chamber 30. The cooling of oil is effected by circulation around the tubing 28 caused by build-up of air pressure in the chamber portion 32 forcing oil to the bottom of the heat exchanging means through the tube 34 into chamber 24 to be forced from the heat exchanger through a conduit or tubing 38, extending through the heat exchanging means 22, to an aperture 40 in the upper portion of the wall 26.

The conduit 38 is connected from the heat exchanger to the brake assembly 20 and specifically to an oil-air control valve means, generally indicated by the numeral 50. The valve means 50 includes an inner cylindrical hollow portion 52 in which a spool, generally indicated by the numeral 54, is reciprocable in accordance with brake actuation to cause a first land 56 and a second land 58 to open and close the following passage connections within the valve means 50. The conduit 38 is connected with an annular passage 60 extending radially outwardly from the hollow portion 52 so that, when the first land 56 is moved free of blocking location therewith, oil can pass freely through the hollow interior 52 to a centrally located annular passage 62 communicating with a conduit 64 in the brake assembly. The conduit 64 transmits the oil to an internal diameter portion of brake structure described in further detail below. The oil passes radially outwardly from the internal diameter portion of the brake assembly and collects in a lower portion or sump, generally indicated by the numeral 70 in the bottom of the brake assembly. A screen and sump intake 72 is located with the sump 70 so that a scavenging pump means, generally indicated by the numeral 74, can return the oil through a conduit 76 to an opening 78 in the upper portion of the heat exchanging means 22. The scavenging pump means includes an axially driven sun or pump driving gear, generally indicated by the numeral 80, about which are disposed a plurality of idler pumping gears. In the embodiment of Figure 1, there are three of these idler pumping gears, indicated generally by the numeral 82.

The position of the oil-air control valve means 50, shown in Figure 1, is such that the land 56 is blocking the flow of oil through the conduits 38 and 64 to the sump but with the land 58 leaving the system of the present invention free for passage of air as follows. The upper chamber portion 32 in the heat exchanging means contains air under pressure which can pass through a conduit 84 to the control valve 50 into communication with a cavity 86 within valve body 87. The cavity 86 communicates with the conduit 64 through the inner hollow portion 52 of the valve means 50 for circulation of air radially outwardly from the inner diameter portion of the brake assembly to be scavenged through the intake screen 72 by the pump 74 for return circulation through conduit 76 to the heat exchanging means. The pump 74 with the idlers 82 driven by sun gear 80 force the air through the conduit 76 such that a pressure build-up occurs in the chamber portion 32 of the heat exchanging means. This pressure build-up causes a head to be formed above the oil in the chamber 30 capable of forcing oil through conduit 34 and through conduit 38 whenever land 56 permits passage of oil with brake actuation in the present invention. However, the pressure build-up may become excessive and, therefore, the cavity 86 in the valve means 50 attached to the brake assembly 20 is provided with a blow-off or safety check valve, generally indicated by the numeral 90. The check valve has a ball member 92 biased into sealing engagement at one end of a passage 94 in the body 87 under the urge of a spring 96 disposed in a safety valve chamber 98 in the body 87. The chamber 98 is connected to an open interior portion 100 of the brake assembly through a passage 102 permitting escape of air through a vent, generally indicated by a numeral 104. The venting occurs whenever the air pressure within the system exceeds the spring force of spring 96 such as 15 p.s.i. Venting can occur when the land 58 of the spool 54 is moved into blocking position to cut off communication of the cavity 86 with the internal hollow portion 52 of the valve means. The lands 56 and 58 are interconnected by a rod portion 106 and movement of the spool 54 is caused by brake actuation as will be explained in further detail below.

The purpose of providing the valve means 50 with conduits connectible to permit either air or oil flow through the brake assembly as outlined above concerns both the cooling action of fluid through the brake assembly and the drag frictional loss, or horsepower loss in the brake assembly due to varying viscosity of oil relative to air. The oil is circulated through the brake assembly whenever the brakes are actuated because of the better heat exchanging qualities thereof and the air is circulated through the brake assembly when the brakes are not actuated because air passes more freely through various brake structures and conduits with less resistance thereto and, the friction plates have less viscous drag in air than in oil, and, therefore, less horsepower loss is encountered as the wheels turn with motor vehicle movement.

Figure 2:
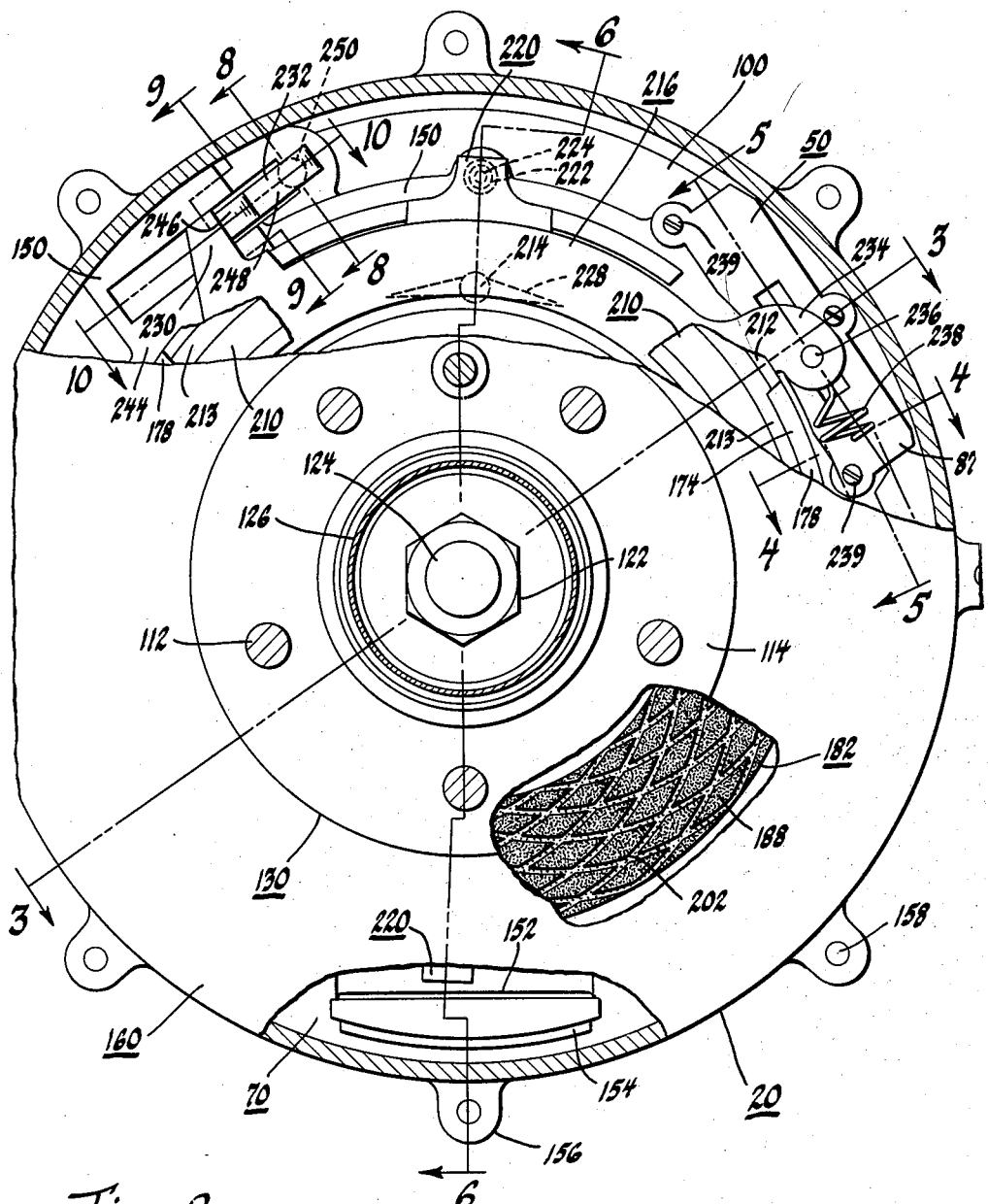
Figure 2 is a front side elevational view partially in section along line 2—2 of Figure 6 of a brake assembly represented schematically in Figure 1.
Figure 6:
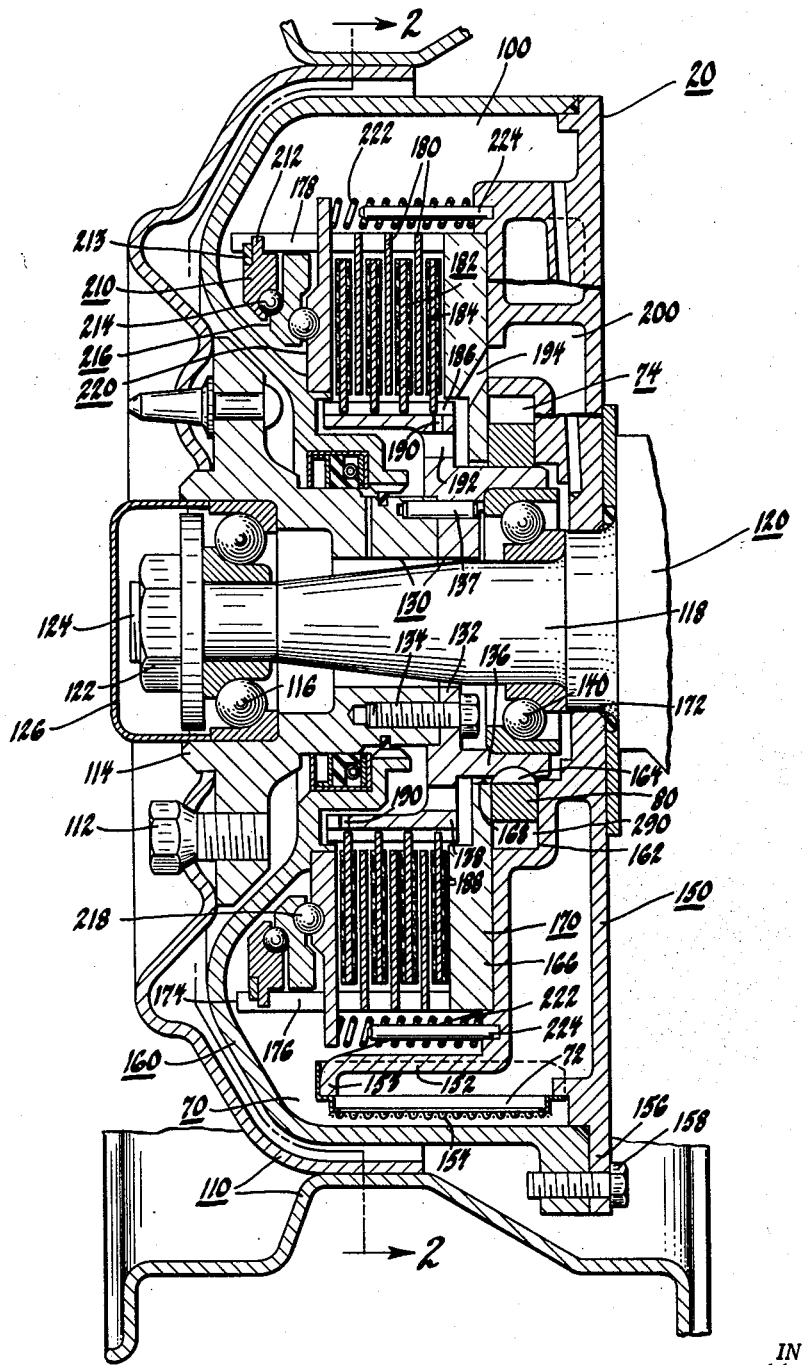
Figure 6 is a cross-sectional elevational view of the brake assembly taken along line 6—6 of Figure 2.

The wheels are mounted on brake assembly structure shown in Figures 2 and 6. Figure 6 shows a wheel rim, generally indicated by the numeral 110, and which is secured by a plurality of bolts 112 to a wheel hub 114. The wheel hub 114 is rotatably supported by bearings 116 relative to axial extension 118 of a wheel steering knuckle assembly or axle, generally indicated by the numeral 120. The bearings are locked into position for permitting rotation relative to the fixed axle 118 by means of a retaining nut 122 threaded onto an end portion 124 of the axle 120. A grease cup 126 is fitted into tight engagement with the wheel hub in a conventional manner. It is to be understood that the brake assembly and control system of the present invention is being shown with front wheel structure of a motor vehicle only for purposes of illustration and that the present invention can be applied to rear wheel structures equally well. The wheel hub 114 comprises a portion of a front hub assembly, generally indicated by the numeral 130. The front hub assembly includes a clutch hub, generally indicated by the numeral 132, rigidly fixed to the wheel hub 114 by means of a bolt 134 and guide pin 137 extending between the wheel and clutch hub portions. The clutch hub 132 includes a longitudinally extending small diameter portion 136 visible in Figure 6 as well as a large diameter portion 138 extending longitudinally in a direction opposite to that of the small diameter portion 136. The small diameter portion 136 is rotatably supported by an axially inwardly positioned bearing assembly 140 relative to the axle 118, thus supporting the entire hub assembly 130 for free rotation relative to the fixed axle or steering knuckle assembly.

Figure 6 further shows a brake backing plate, generally indicated by the numeral 150, having a flange portion 152 at a bottom end thereof forming a shoulder 153 for receiving a screen 154 which is part of the sump intake 72 indicated schematically in Figure 1. The brake backing plate 150 is provided with bolt receiving flange portions 156 shown in Figures 6 and 7 so that bolts 158 can securely fasten a front brake housing or brake cover member, generally indicated by the numeral 160. The cooperation of the front brake housing 160 with the brake backing plate forms the space 100 in which further brake structure is disposed and through which oil or air passes for cooling purposes in accordance with the present invention. The brake backing plate as shown in Figure 6 is provided with a recess 162 forming a pumping chamber in which the sun gear 80 is rotatable due to a Woodruff key 164 providing a driving connection between the gear 80 and a keyway within the outer peripheral surface of the small diameter portion 136 of clutch hub 132. The pumping action caused by the gear 80 is shown in further detail later. The chamber 162 is closed by a radial portion 166 of a pump cover, generally indicated by the numeral 170. The radial portion of the pump cover has a central aperture 168 through which the hub assembly 130 extends and the pump cover, together with the brake backing plate 150, are nonrotatably secured by a tight fit with the axle at a central opening 172 on the brake backing plate.

The pump cover 170 also includes an annular flange portion, generally indicated by the numeral 174, provided with splines, such as 176 and 178, on which nonrotatable braking discs, generally indicated by the numeral 180, are attached. These stationary discs 180 cooperate with complementary rotatable discs, generally indicated by the numeral 182, which have a central metallic portion 184 attached at their radially inward periphery to splines 186 formed with the large diameter portion 138 of the clutch hub 132. The metallic discs 184 are surfaced on opposite sides with a friction material bonded thereto, indicated generally by the numeral 188. The nonrotatable discs 180 and rotatable discs 182 are movable into frictional engagement upon actuation of a braking mechanism described in further detail below. It is to be noted that, as shown in Figure 6 and more clearly in Figure 3, the clutch hub 132 is provided with a plurality of staggered rows of holes, generally indicated by the numeral 190, which extend through the large diameter portion 138 as indicated in the drawings. These holes communicate with a passage 192 extending axially through the clutch hub 132 to receive cooling fluid flow through apertures such as passage 194 in the pump cover communicating with the (pump) output chamber space, generaally indicated by the numeral 200 formed integral with the brake backing plate 150. The exact location of this chamber space 200 will be shown schematically and described with Figure 7. The output of cooling fluid through these passages and the holes 190 in the large diameter portion 138 of hub 132 is channeled between the cooperating discs 180 and 182 only when the braking mechanism is applied due to the action of valve control 50. A plurality of recesses or grooves 202 formed in the lateral surface of the friction material 188 facilitates the flow of cooling fluid when the discs are in engaging position relative to each other. The cooling liquid passes radially beyond the discs and escapes outwardly between splines 176 and 178 of the pump cover flange 174 to pass into a bottom portion 70 within the axially outer portion 160 of the brake housing and brake backing plate 150 to be withdrawn by the scavenging pump action through the intake 72 as described with Figure 1.

Figure 3:
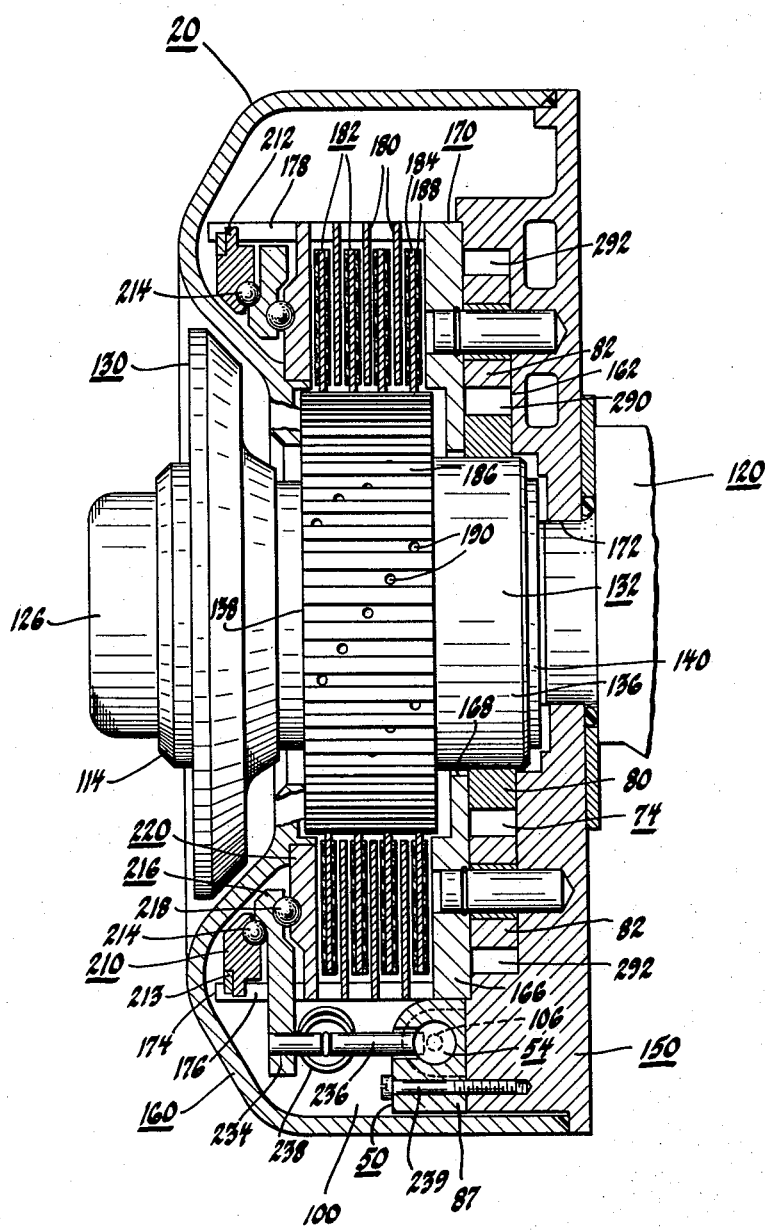
Figure 3 is a partial cross-sectional view of the brake assembly taken along line 3—3 of Figure 2.

As shown in Figures 3 and 6, the brake actuating mechanism includes a brake cam reaction plate, generally indicated by the numeral 210, having a splined radially outwardly extending flange 212 engaging the splines 176 and 178 of the pump cover 170. An internal snap ring 213 retains the brake cam reaction plate with these splines. A plurality of balls 214 cooperate with a brake cam, generally indicated by the numeral 216, which, in turn, has a cooperative effect through balls 218 with a brake pressure plate, generally indicated by the numeral 220. The brake pressure plate 220 is biased toward the brake cam 216 and brake reaction plate 210 by a plurality of pressure plate release springs, generally indicated by the numeral 222, which are disposed about pins 224 relative to the brake backing plate 150, which are stationary. A rotative movement of brake cam 216 is effected by brake cylinder mechanism through bell crank 232 as described in further detail below. The rotative movement of brake cam 216 causes the balls 218 and 214 to roll on inclined surfaces of the cam. Ball 214 and inclined surface 228 are indicated by the dotted lines in a fragmentary cut-away view of Figure 2.

Figure 2 further illustrates the structural shape of the brake cam 216 and its cooperation with other parts of the brake assembly. As shown in the fragmentary cut-away view of Figure 2, the brake cam 216 has a first radially outwardly extending lug or arm, generally indicated by the numeral 230, cooperating with a bell crank, generally indicated by the numeral 232, of the brake cylinder mechanism. The brake cam 216 also has a second radially extending lug or arm, generally indicated by the numeral 234, angularly displaced away from the first lug or arm 230. The second lug or arm 234 engages a valve operating pin 236, shown in Figures 2 and 5. This pin 236 extends into engagement with the spool 54 of the oil-air control valve 50 originally described with Figure 1. Figure 5 further shows a cam return spring 238 stretched between a central portion of pin 236 and a fixed dowel or abutment 240 secured to the brake backing plate 150. This spring 238 biases the brake cam 216 in a clockwise direction as viewed in Figure 2 in opposition to any force applied through bell crank 232 upon the first lug or arm 230 with the brake actuating mechanism.

Figure 10 is a cross-sectional view taken along line 10—10 of Figure 2 to more clearly illustrate the cooperation of the brake operating bell crank 232 with the first lug or arm 230 of the brake cam 216. A pivot 242 serves to mount the bell crank rotatably relative to a flange 244 formed with the brake backing plate 150 as shown in Figure 10. One arm 246 of the bell crank 232 engages the lug 230 and another arm 248 of the bell crank engages a brake cylinder rod 250 extending through an opening 251 and chamber 252 in the brake backing plate 150 from the brake wheel cylinder housing 254. The brake cylinder housing 254 also contains a chamber 256 in which a brake cylinder cup 258 is movable against a head portion 260 of the brake cylinder rod. The cylinder cup 258 is in sealing engagement with the inner periphery of the chamber 256 and is movable to pivot the bell crank 232 in accordance with brake fluid supplied to the housing 254 upon actuation of brakes on a motor vehicle in a conventional manner. The brake cylinder cup 258 is biased relative to the housing 254 at one end of the chamber 256 by a spring 262 disposed therewith. A brake cylinder rod spring 264 is disposed around the brake cylinder rod 250 in seating engagement with one side of the head portion 260 thereof and the brake backing plate 150 as shown in Figure 10.

Figure 9, which is a cross-sectional view taken along line 9—9 of Figure 2, shows a side view of the bell crank 232 cooperating with the lug 230 as well as the pivot pin 242 mentioned above.

Figure 8 is a cross-sectional view taken along line 8—8 of Figure 2 so as to show the housing 254 and brake cylinder cup 258 in conjunction with a fitting 270 which is threaded to an opening 272 in the housing for channeling brake actuating fluid through a conduit 274 by way of passage 276 in the housing into chamber 256. The brakes are actuated in a conventional manner to cause brake fluid under pressure to be applied against the cup 258 for moving the brake cylinder rod 250 effecting pivotal action of the bell crank 232 as described above. The housing 254 is secured to the rear of the brake backing plate 150 by bolts 278 as shown in Figures 8 and 10.

The oil-air control valve shown in the partial cross-sectional view of Figure 2 is disposed inside the brake assembly in chamber 100 surrounded by the front brake housing 160 and brake backing plate 150. This relationship is shown more clearly in Figure 4 which is a cross-sectional view taken along line 4—4 of Figure 2. The relationship is shown also in Figure 3 which is a cross-sectional view taken along line 3—3 of Figure 2. Figure 3 further shows how the valve 50 is attached by bolt means such as 239 to the brake backing plate 150. Figure 3 also shows idler sprockets 82 cooperating with the drive or sun gear 80 of the pumping means described in further detail with Figure 7. The control valve 50 is shown in Figure 4 with the spool 54 movable therein as described above. The cam return spring 238 is shown in this cross-sectional view as well as the cooperating discs 180 and 182 together with the pump cover 166. The pump cover is secured by bolts 280 in fixed relationship with the brake backing plate 150. The passages formed with the brake backing plate 150 as shown partially in views of Figures 3, 4, 5, 6, 9 and 10 can be more clearly understood by referring to a diagrammatic representation thereof shown with Figure 7.

Figure 7 is a view looking from the right of Figure 6 at the rear of the wheel and brake assembly directly at the brake backing plate 150. For purposes of illustration, the drawing in Figure 7 has been cut-away to expose a fragment of the sun or driving gear 80 of the scavenging pump means indicating teeth 290 extending radially outwardly therefrom in engagement with teeth 292 of one of the idler sprockets 82 as described with Figure 1. Figure 7 shows three of these idler sprockets disposed in quadrature positions relative to each other and the hydraulic line 76 communicating with the heat exchanging means 22 of Figure 1. The line 76 is connected to a fitting 294 secured to the brake backing plate 150. Passages 296, connected with each cavity 298 of the idler sprockets, merge in a cavity 299 associated with the fitting 294 and communicate with the conduit 76. Each cavity 298 of the idler sprockets has an output portion 300 representing the space into which cooling fluid which may be either the oil or the air is pumped to circulate through the heat exchanging means as described with Figure 1. Also associated with each cavity 298 of the idler sprockets is a low pressure or intake portion 301 of the pumps communicating through conduits, or passages, 302 with the sump intake 72 and screen 154 to scavenge oil or air from sump 70 inside the brake assembly. Conduit 64 of Figure 1 includes output chamber space 200, passage 194, and holes 190 of Figure 6 connected to receive fluid from valve 50 by way of the heat exchanging means 22 from conduit 76 communicating through passages 296 of Figure 7 with each output portion 300 of pump idler cavities 298. Figure 7 also shows a hidden view of the oil-air control valve 50 including an air passage or conduit represented by the numeral 86 in Figure 1. The pressure relief valve 90 described with Figure 1 is shown in Figure 7 together with conduit 84 leading through a fitting 306 and continuing to be connected to the heat exchanging means 22 adjacent the air chamber portion 32 therein. A flap valve 310 is shown diagrammatically in Figure 7 near the outlet 102 of safety valve 90 permitting escape of air as noted with the description of Figure 1 from inside the brake assembly. The fitting 312 in Figure 7 diagrammatically represents the brake cylinder housing 254 shown in Figure 10 together with the conduit 274 of Figure 8. It is understood that the conduit 274 channels hydraulic brake fluid in a conventional manner to parts within the wheel cylinder housing 254 as described above for effecting rotative movement of the brake cam 216 as described above.

Also shown in Figure 7 is a diagrammatic representation of the conduit 38 supplying cooled oil from the heat exchanging means of Figure 1 through a fitting 320 secured to the brake backing plate 150 and continuing as conduit 38' to supply oil to the air-oil control valve means 50. Depending upon the positioning of the spool 54 within valve 50 as described with Figure 1, oil may be permitted to pass into the cavity indicated generally by the numeral 200 in Figure 6 and passing through aperture 194 of the pump cover 166 to flow between the engaging brake discs 180—182 as described above.

Summarizing the operation of the system and brake assembly of the present invention, the scavenging pumps operate as a unit driven by the sun gear 80 with wheel rotation to remove air or oil from the sump in the brake assembly and discharge as a unit to the heat exchanging means separating air and oil in chamber portions 30 and 32 of the heat exchanging means as described with Figure 1. From this reservoir in the heat exchanging means, when the brake is not applied, air goes back freely to the brake housing and assembly and is recirculated by the pumps to effect smooth flow around the structural parts described above and maintaining the pressure throughout the system relatively constant. This air circulation offers the least resistance drag or horsepower loss with wheel rotation which can be obtained when structure as in the present invention is used. The air circulation eliminates a problem of high horsepower loss encountered whenever friction plates rotate in oil and circulation of large volume of oil through the braking system takes place. When the brake is applied, the cam reaction plate cooperating with the balls urges the brake pressure plate through intermediate action of the brake cam to cause engagement of the fixed and rotatable brake discs simultaneously with actuation of the spool valve to a second position closing off air passages. As soon as the air passages are closed off, air pressure builds up in the portion 32 of the heat exchanging means forming a reservoir, limited in pressure accumulation by a flow-off check valve, causing flow of oil through the chamber 24 of the heat exchanging means and into the brake assembly to cool cooperating engaging parts. When the spool valve is moved to the position corresponding to brake actuation as described with Figure 1, oil flows from the lower part of the reservoir through tube 34 to be forced by air pressure through the cooler, through the air-oil control valve 50, through the cooperating discs 180—182 to the brake housing sump 204 from which it is scavenged by the pumps back to the reservoir It is to be noted that the arrangement in the brake assembly and cooling system therewith is capable of permitting a large number of repeated stops from high speed without undue heating of cooperating brake discs.

While the embodiment of the invention as herein disclosed constitutes a preferred form, it is to be understood that other forms might be adopted.

What is claimed is as follows:

1. A hydraulic system for use with a hydraulically actuated multiple disc wheel brake assembly, comprising, a brake assembly housing forming a sump chamber, a plurality of gear-type pumps operably associated with the brake assembly, heat exchanging means including a cooler, an air separator, and fluid reservoir connected by conduits with said pumps, said pumps being provided with ports so that the sump of said housing is scavenged as a unit and fluid is discharged as a unit to the air separator and reservoir, and a valve connected with said housing operable concurrently with brake actuation from a first to a second position, said valve in the first position connecting a conduit from the air separator portion of said heat exchanging means with passages permitting free air circulation by said pumps through said brake housing, said valve in the second position upon brake actuation blocking the free air circulation passages and opening passages by which fluid is forced by air pressure trapped in the air reservoir through the cooler, through said valve, and through said brake housing back to the sump to be scavenged by said pumps.

2. A hydraulic system for use with a vehicle wheel brake assembly having a plurality of cooperable brake discs, comprising, a brake assembly housing forming a sump chamber, a plurality of gear-type pumps operably associated with the brake assembly, heat exchanging means including a cooler, an air separator and fluid reservoir connected by conduits with said pumps, said pumps being provided with ports so that the sump of said housing is scavenged as a unit and fluid is discharged as a unit to the air separator and reservoir, a valve connected with said housing operable concurrently with brake actuation from a first to a second position, said valve in the first position connecting a conduit from the air separator portion of said heat exchanging means with passages permitting free air circulation by said pumps through said brake housing, said valve in the second position upon brake actuation blocking the free air circulation passages, and a blow-off check valve connected by a passage to the air conduits to vent excess air pressure above a predetermined value, said valve in the second position upon brake actuation blocking the free air circulation passages and opening passages by which fluid is forced by air pressure trapped in the air reservoir through the cooler, through said valve and said brake housing and thence between cooperable brake discs to provide cooling of said discs before returning to said sump.

3. A hydraulic circuit for use with a vehicle wheel brake assembly having a plurality of cooperable brake discs fluid cooled with low horsepower loss when the brake is not applied, comprising, a brake assembly housing forming a sump chamber, a plurality of gear-type pumps operably associated with the brake assembly, heat exchanging means including a cooler, an air separator and fluid reservoir connected by conduits with said pumps, said pumps being provided with ports so that the sump of said housing is scavenged as a unit and fluid is discharged as a unit to the air separator and reservoir, a valve connected with said housing operable concurrently with brake actuation from a first to a second position, said valve in the first position connecting a conduit from the air separator portion of said heat exchanging means with passages permitting free air circulation by said pumps through said brake housing, said valve in the second position upon brake actuation blocking the free air circulation passages, and a blow-off check valve connected by a passage to the air conduits to vent excess air pressure above a predetermined value, said valve in the second position upon brake actuation blocking the free air circulation passages and opening passages connecting with space between the brake discs permitting fluid flow as forced by air pressure trapped in the air reservoir through the cooler, through said valve, and cooling between the brake discs from an internal diameter thereof radially outwardly to the sump of said housing to be scavenged by said pumps.

4. A multiple-disc-type wheel brake assembly, comprising, a housing including a brake backing plate formed with multiple passages and chambers, the chambers including a number of pump recesses and a sump for fluid, an axle member to which said housing is fixed, a hub rotatably disposed about said member, a fluid pump drive gear attached to rotate with said hub, a plurality of driven idler pump gears operatively associated with said drive gear rotatable within the pump recesses of said housing, an annular pump cover having flanges extending in a direction away from the backing plate to which said cover is rigidly attached, a plurality of stationary brake discs attached to the flanges of said cover, an annular body attached to rotate with said hub having flanges spaced intermediate said axle member and the flanges of said cover, a plurality of brake discs attached to the flanges of said body and movable thereby complementing said stationary brake discs, brake actuating means operatively associated with said housing and said discs, and a valve means attached to said housing capable of controlling free flow of air as well as a fluid for cooling between said discs in response to movement of said actuating means.

5. A multiple-disc-type wheel brake assembly, comprising, a housing, a plurality of stationary discs attached to said housing, an axle member supporting said housing, a hub element rotatably journalled on said axle member and having both large and small diameter portions extending concentrically and longitudinally thereof, a plurality of brake discs attached to the large diameter portion rotatable therewith and extending radially outwardly to complement said stationary discs, a sun gear attached to the small diameter portion rotatable therewith having teeth protruding radially outwardly, a pinion gear journalled in said housing with cooperable teeth meshing with said sun gear driven thereby in a fluid pumping capacity to scavenge a sump in said housing, a valve means attached to said housing to control passages for flow of the fluid for cooling between said complementary discs to the sump, a cam means spaced from said complementary discs to provide frictional engagement of said complementary discs, means connecting said cam means to said valve means for operation of said valve means upon rotation of said cam means, fluid actuating means to provide rotational movement of said cam means effecting brake application force between said discs and actuation of said valve means effecting flow of cooling fluid between said discs to the sump.

6. A multiple-disc-type wheel brake assembly, comprising, a housing, a plurality of stationary discs attached to said housing, an axle member supporting said housing, a hub element rotatably journalled on said axle member and having both large and small diameter portions extending concentrically and longitudinally thereof, a plurality of brake discs attached to the large diameter portion rotatable therewith and extending radially outwardly to complement said stationary discs, a sun gear attached to the small diameter portion rotatable therewith having teeth protruding radially outwardly, a plurality of pinion gears separately journalled in said housing with cooperable teeth meshing with said sun gear driven thereby in a fluid pumping capacity to scavenge a sump in said housing, a valve means attached to said housing to control passages for flow of the fluid for cooling between said complementary discs to the sump, a cam means longitudinally spaced from said complementary discs and operable to cause engagement therebetween, a brake actuating fluid cylinder having a piston and rod reciprocable therein attached to said housing, and a bell crank pivotally attached to said housing converting reciprocable movement of the rod in engaging said bell crank into rotary movement of said cam means effecting brake application force between said discs and actuation of said valve means effecting flow of cooling fluid between said discs to the sump.

7. A multiple-disc-type wheel brake assembly, comprising in combination, a housing forming a sump space therein, a plurality of stationary discs attached to said housing, an axle member supporting said housing, a hub element rotatably journalled on said axle member and having both large and small diameter portions extending concentrically and longitudinally thereof, a plurality of brake discs attached to the large diameter portion rotatable therewith and extending radially outwardly to complement said stationary discs, an annular gear with external teeth attached to the small diameter portion rotatable therewith, three idler sprockets journalled in said housing with external teeth in driving engagement with said annular gear to scavenge the sump space in said housing, a valve means attached to said housing operable to move into first and second positions, said valve means in the first position blocking and in the second position opening a passage for cooling fluid flow to said discs and the sump space, a blow-off check valve associated with said valve means by a passage to vent excess air pressure above a predetermined value from said housing, and actuating means operatively associated with both said discs and said valve means for concurrently applying braking force and cooling flow of fluid between said discs.

8. A multiple-disc-type wheel brake assembly, comprising in combination, a housing forming a sump space therein, a plurality of stationary discs attached to said housing, an axle member supporting said housing, a hub element rotatably journalled on said axle member, a plurality of brake discs attached at one side to said element rotatable therewith and extending radially outwardly to complement said stationary discs, a plurality of pump members rotatably journalled in said housing to scavenge the sump space, a driving gear attached to said element and operably engage with said pump members, a valve means included in the assembly operable to control flow of cooling fluid between said discs to the sump space, a filtering screen attached to said housing through which the cooling fluid is drawn from the sump space by said pump members, and actuating means operatively associated with both said discs and said valve means for concurrently applying braking force and cooling flow of fluid between said discs.

References Cited in the file of this patent

UNITED STATES PATENTS

| | | |
|---|---|---|
| 1,174,678 | Carpenter et al. | Mar. 6, 1916 |
| 1,740,993 | McDonnell | Dec. 24, 1929 |
| 2,127,557 | Ells | Aug. 23, 1938 |
| 2,278,144 | Milan | Mar. 31, 1942 |
| 2,378,100 | Pogue | June 17, 1945 |
| 2,526,143 | Lambert | Oct. 17, 1950 |
| 2,633,941 | Zindler | Apr. 7, 1953 |
| 2,655,054 | Kelley | Oct. 13, 1953 |
| 2,659,468 | Hobbs | Nov. 17, 1953 |
| 2,788,870 | Heck | Apr. 16, 1957 |

FOREIGN PATENTS

| | | |
|---|---|---|
| 701,725 | Great Britain | Dec. 30, 1953 |